(12) United States Patent
Smith

(10) Patent No.: US 9,201,193 B1
(45) Date of Patent: Dec. 1, 2015

(54) TEXTURED FIBER OPTIC COUPLED IMAGE INTENSIFIED CAMERA

(71) Applicant: EXELIS, INC., McLean, VA (US)

(72) Inventor: Arlynn Walter Smith, Blue Ridge, VA (US)

(73) Assignee: Exelis, Inc., McLean, VA (US)

(*) Notice: Subject to any disclaimer, the term of this patent is extended or adjusted under 35 U.S.C. 154(b) by 146 days.

(21) Appl. No.: 13/769,518

(22) Filed: Feb. 18, 2013

(51) Int. Cl.
| | |
|---|---|
| G02B 6/06 | (2006.01) |
| G02B 6/04 | (2006.01) |
| G02B 6/08 | (2006.01) |
| G02B 6/32 | (2006.01) |
| G02B 6/42 | (2006.01) |

(52) U.S. Cl.
CPC .. G02B 6/04 (2013.01); G02B 6/08 (2013.01); G02B 6/32 (2013.01); *G02B 6/06* (2013.01); *G02B 6/4204* (2013.01)

(58) Field of Classification Search
CPC ... H04N 5/238; H04N 5/2253; H04N 5/2254; H04N 5/2258; H04N 5/335; G02B 6/4204; G02B 6/32; G02B 6/06; G02B 6/08

USPC .......... 385/74, 75, 82, 93, 116, 119–121; 348/217.1, 158, 164, 222; 359/630, 359/631

See application file for complete search history.

(56) References Cited

U.S. PATENT DOCUMENTS

| | | | |
|---|---|---|---|
| 4,380,365 A * | 4/1983 | Gross | 385/33 |
| 4,980,772 A * | 12/1990 | Kawamura et al. | 348/217.1 |
| 5,268,570 A | 12/1993 | Kim | |
| 6,560,029 B1 * | 5/2003 | Dobbie et al. | 359/631 |
| 6,595,674 B1 * | 7/2003 | Yoneda | 362/555 |
| 2003/0219207 A1 * | 11/2003 | Guy | 385/49 |
| 2008/0128631 A1 * | 6/2008 | Suhami | 250/370.09 |
| 2010/0103267 A1 * | 4/2010 | O'Rourke | 348/158 |

* cited by examiner

*Primary Examiner* — Kaveh Kianni
*Assistant Examiner* — Hung Lam
(74) *Attorney, Agent, or Firm* — RatnerPrestia

(57) ABSTRACT

A fiber optic bundle couples light from an image intensifier ($I^2$) to an image sensor. The fiber optic bundle includes multiple cores for directing the light from the $I^2$ to the image sensor, and each core has an output surface shaped into a recessed concave surface for focusing the light toward the image sensor. A bond layer is interposed between the output surface of the core and the image sensor. The bond layer is shaped into multiple micro-lenses, each micro-lens configured to conform to the recessed concave surface of each respective core.

17 Claims, 8 Drawing Sheets

TEXTURED FIBER OPTIC COUPLED IMAGE INTENSIFIED CAMERA

FIELD OF THE INVENTION

The present invention relates, in general, to an intensified camera, which includes an image intensifier ($I^2$) and an image sensor. More specifically, the present invention relates to using a textured fiber optic bundle to couple the $I^2$ and the image sensor.

BACKGROUND OF THE INVENTION

FIG. 1 is a cross-sectional view of a conventional image intensifier tube, generally designated as 10. As shown, image intensifier tube 10 includes a cathode plate, generally designated as 11, microchannel plate (MCP) 12, and a fiber optic anode plate, generally designated as 13. Light enters cathode plate 11 and is guided through a window striking a photocathode 15. Due to photoelectric conversion, electrons are emitted from photocathode 15. The electrons exiting from cathode plate 11 are amplified by MCP 12. These electrons are accelerated and caused to impinge on phosphor face 14 of fiber optic anode plate 13, thereby emitting fluorescent light. The emitted light is guided through fiber optic anode plate 13, by way of multiple fibers 16, so as to yield output light.

Although not shown, the exiting light from fiber optic anode plate 13 may be coupled to a charge coupled device (CCD) by way of a tapered fiber optic bundle. As shown in FIG. 1, photocathode 15, MCP 12 and phosphor face 14 are contained within a vacuum formed by housing 17.

It will be appreciated that image intensifier tube 10 is not drawn to scale. More specifically, multiple fibers 16, in the fiber optic anode plate are not drawn to scale. There are typically millions of fibers 16, in the anode plate.

FIG. 2A shows an individual fiber 20, representing each of multiple fibers 16 in fiber optic anode plate 13, which may or may not be of the same materials or dimensions. Fiber 20 includes glass rod 22 and glass cladding 21, which surrounds the glass rod. The glass material of cladding 21 is different from the glass material of rod 22.

Optical fiber 20 is formed in the following manner: A glass rod and a cladding tube, coaxially surrounding the glass rod, are suspended vertically in a furnace. The temperature of the furnace is elevated to the softening temperature of the glass. The rod and cladding tube fuse together into single fiber 20. The fiber 20 is fed into a traction mechanism, where the speed is adjusted until a desired fiber diameter is achieved. The fiber is then cut into shorter lengths.

Several thousands of the cut single fiber 20 are then stacked into a mold and heated to a softening temperature of the glass, in order to form an array 25, as shown in FIG. 2B. The array 25 is also known as a multi assembly or a bundle and includes several thousand single fibers 20, each having a glass rod and a cladding tube. The multi assembly 25 is suspended vertically in a drawing machine and drawn to decrease the fiber diameter, while still maintaining the configuration of the individual fibers. The multi assembly 25 is then cut into shorter lengths of bundles.

Several hundreds of the cut bundles 20 are then stacked and packed together into a large diameter glass tube (not shown). After stacking and packing the bundles, the entire assembly is heated and fused together. In this manner, active areas of the fiber optic anode plate are formed from the millions of individual fibers 20.

SUMMARY OF THE INVENTION

To meet this and other needs, and in view of its purposes, the present invention provides a camera including an image intensifier ($I^2$), an image sensor, and a fiber optic bundle for coupling the $I^2$ and the image sensor. An output surface of the fiber optic bundle is configured to provide light to the image sensor. The output surface of the fiber optic bundle is shaped to reduce spreading of the light provided to the image sensor, and the output surface is shaped for focusing the light.

The fiber optic bundle includes multiple fibers, each fiber comprised of a cladding surrounding a core. The light provided to the image sensor is configured to exit the core. The output surface of the fiber optic bundle is shaped to focus the light exiting the core to form a spot size having a diameter of $D_t$, and $$D_t < D_o,$$

where $D_o$ is defined as a spot size formed by the output surface of the fiber optic bundle when not shaped to focus the light exiting the core.

A bond layer is disposed between the output surface of the fiber optic bundle and the image sensor. The bond layer is configured into a shape that is complementary to the shape of the output surface of the fiber optic bundle, thereby presenting an index of refraction determined by the bond layer to the light exiting the multiple fibers.

A bond layer is disposed between the output surface of the fiber optic bundle and the image sensor. A boundary line is formed between the bond layer and the output surface of the fiber optic bundle for providing, in sequence, (a) an index of refraction of the output surface of the fiber optic bundle and (b) an index of refraction of the bond layer to the light exiting the multiple fibers. A top portion of the bond layer is shaped into multiple micro-lenses. The fiber optic bundle includes multiple fibers, each fiber having a concave shape at the output surface of the fiber optic bundle, and the concave shape of each fiber is configured to conform to each micro-lens of the bond layer.

Each fiber includes a core and a cladding surrounding the core, and the core has a diameter of d; the concave shape of each fiber forms a recessed depth of h; and each micro-lens includes a protrusion corresponding to the recessed depth of h.

The bond layer has a thickness of t, and the diameter of d is approximately equal to the thickness of the bond layer of t.

Each fiber includes a core and a cladding surrounding the core. The core includes an index of refraction having a value of $\eta_{core}$ and the cladding includes an index of refraction having a value of $\eta_{clad}$. The bond layer includes an index of refraction having a value of $\eta_{bond}$. The $\eta_{bond}$ value is selected to be higher than either the $\eta_{core}$ value or the $\eta_{clad}$ value.

A bond layer is disposed between the output surface of the fiber optic bundle and the image sensor. The bond layer has a thickness of t. The fiber optic bundle includes multiple cores, each core having a diameter of d, for forming an optical path for the light provided to the image sensor. Each core is shaped to focus the light into a spot size of $D_t$, and $D_t$ is a function of the diameter of d, the thickness of t, and the shape of the output surface of the fiber optic bundle. The shape of the output surface of the fiber optic bundle includes multiple concave recesses in the multiple cores, and the bond layer is shaped to conform to the multiple concave recesses of the multiple cores.

Another embodiment of the present invention is a fiber optic bundle for coupling light from an image intensifier ($I^2$) to an image sensor. The fiber optic bundle includes multiple cores for directing the light from the $I^2$ to the image sensor, each core having an output surface, and the output surface shaped into a recessed concave surface for focusing the light toward the image sensor. A bond layer is interposed between the output surface of the core and the image sensor, in which the bond layer is shaped into multiple micro-lenses. Each micro-lens is configured to conform to the recessed concave surface of each respective core. The image sensor includes a CMOS imager or a CCD imager.

Yet another embodiment of the present invention is an intensified camera system including: an image intensifier ($I^2$), an image sensor, and a fiber optic bundle disposed between the $I^2$ and the image sensor. The fiber optic bundle includes:

Multiple cores for directing the light from the $I^2$ to the image sensor, each core having an output surface, and the output surface is shaped into a recessed concave surface for focusing the light toward the image sensor.

A bond layer is interposed between the output surface of the core and the image sensor, and the bond layer is shaped into multiple micro-lenses, each micro-lens configured to conform to the recessed concave surface of each respective core. A surface of the bond layer facing the image sensor is substantially flat. Each micro-lens has an index of refraction that is greater than an index of refraction of each respective core.

It is understood that the foregoing general description and the following detailed description are exemplary, but are not restrictive, of the invention.

BRIEF DESCRIPTION OF THE FIGURES

The invention may be understood from the following detailed description when read in connection with the accompanying figures.

DETAILED DESCRIPTION OF THE INVENTION

An intensified camera includes an image intensifier ($I^2$) and an image sensor (for example, a CCD or CMOS sensor) coupled together. Coupling elements of a complete intensified camera may be accomplished using a relay lens, or a fiber optic bundle. Of the two coupling methods, the fiber optic bundle results in the smallest format and, in general, has a higher modulation transfer function (MTF). As will be explained, the present invention further improves the MTF of the intensified camera by changing the shape of the output surface of the fiber optic bundle.

Figure 1:
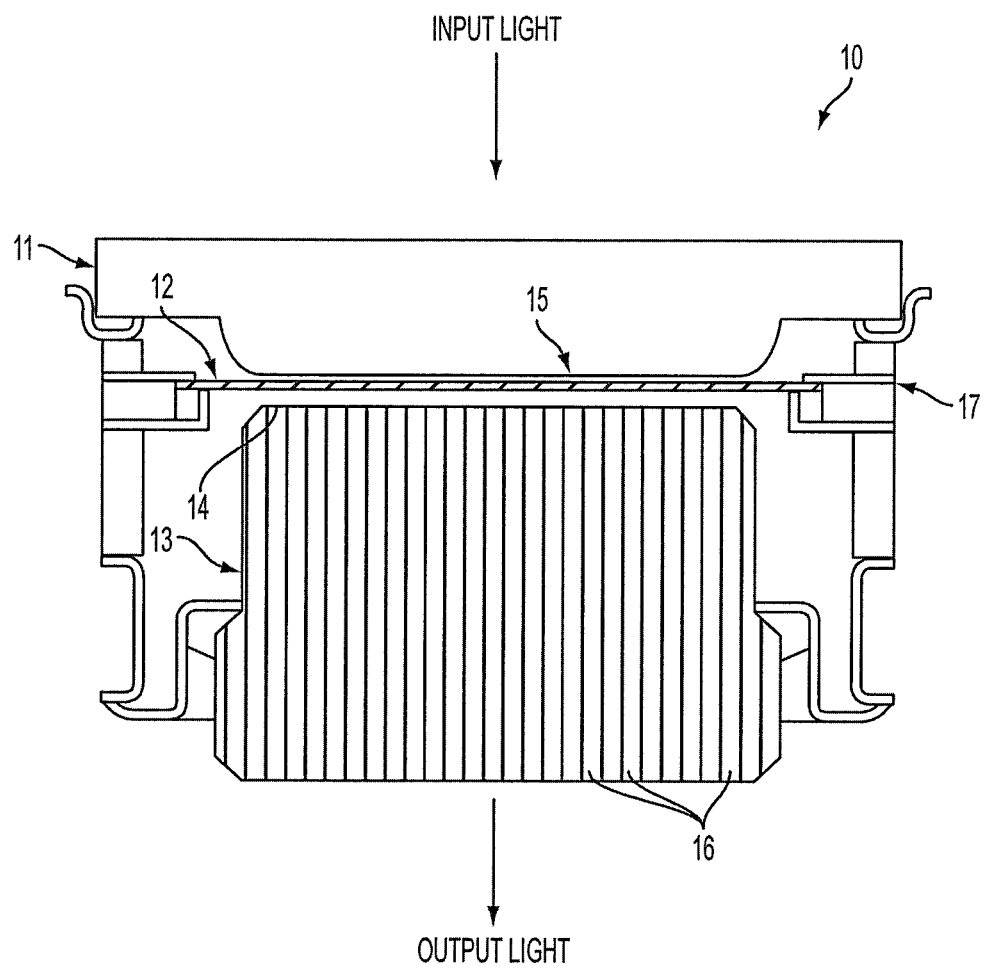
FIG. 1 is a cross-sectional view of a conventional image intensifier tube.
Figure 2A:
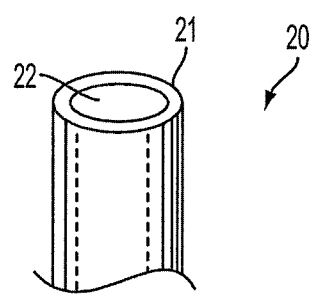
FIG. 2A is a perspective view of a conventional fiber optic including a core and a cladding surrounding the core.
Figure 2B:
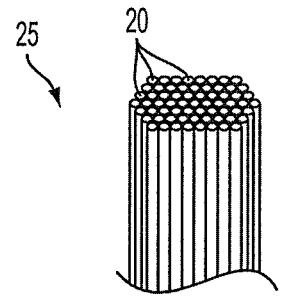
FIG. 2B is a perspective view of a conventional fiber optic stacked array including multiple fiber optics, one of which is shown in FIG. 2A.
Figure 3:
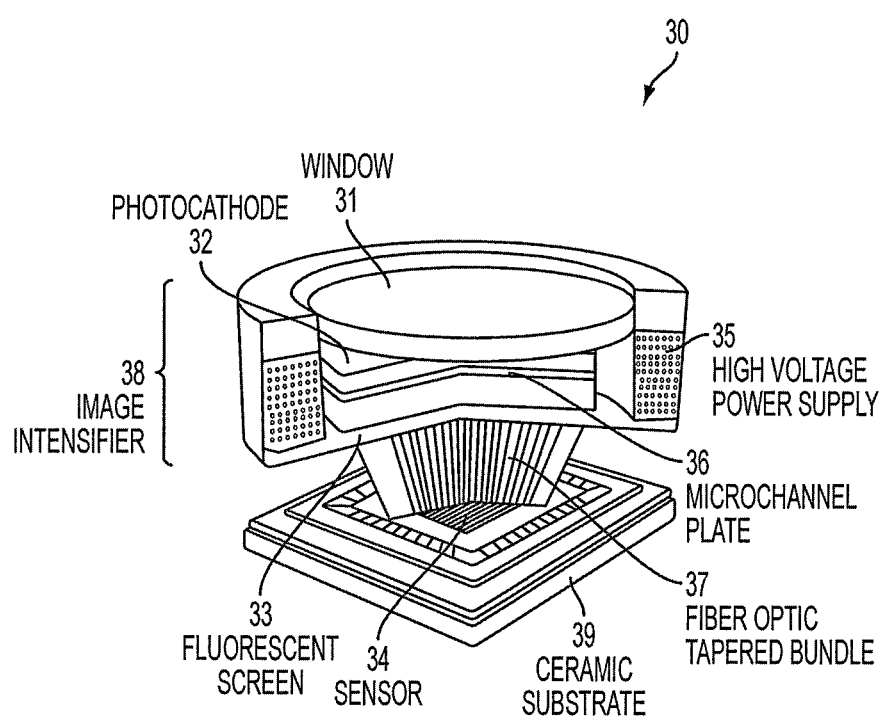
FIG. 3 is a cross-sectional perspective view of a proximity focused image intensifier camera, which includes an embodiment of the present invention.

Referring to FIG. 3, there is shown a cross-sectional perspective view of a proximity focused image intensifier camera, generally designated as 30. As one embodiment of the present invention, camera 30 includes transmissive window 31, photocathode (or simply cathode) 32, microchannel plate (MCP) 36, fluorescent screen (or simply screen) 33, fiber optic tapered bundle (or simply bundle) 37, and image sensor (or imager) 34.

The photocathode 32, screen 33 and MCP 36, the latter disposed between the photocathode and screen, are positioned within an evacuated housing or vacuum envelope, thereby permitting electrons to flow from the photocathode through the MCP and to the screen. Power is provided to the photocathode, MCP and screen by high voltage power supply 35, as shown.

The photocathode detects a light image and changes the light image into an electron image. The MCP amplifies the electron image and the screen changes the electron image back to a light image. A getter (not shown) absorbs gas which is generated during operation of the image intensifier.

It will be appreciated that, as shown in FIG. 3, camera 30 includes image intensifier (or image intensifier tube) 38, fiber optic bundle 37 and image sensor 34. The image intensifier includes window 31, photocathode 32, MCP 36, screen 33 and power supply 35. The image sensor 34 may be any solid state sensor, such as CMOS (complementary metal oxide semiconductor), CCD (charge coupled device) and hybrid EBCCD/CMOS (electronic bombarded CCD or CMOS) sensors. Selection of a sensor depends on the desired application, as CMOS sensors use less power than CCD sensors, but CCD sensors may have a higher fill factor.

The output of sensor 34 produces an intensified image signal that may be sent, by way of a bus, to an image display device (not shown). The output of sensor 34 may be, alternatively, stored in a memory device (not shown).

As shown in FIG. 3, sensor 34 is conventionally disposed in a ceramic substrate 39. The sensor 34 includes an array of terminal pads for providing input/output (I/O) signals. Hundreds of terminal pads are typically disposed around the peripheral circumference of sensor 34. Extending from the bottom of ceramic substrate 39 are a plurality of pins (not shown), which are connected through via-holes to the array of terminal pads. In this manner, electrical contacts are made between sensor 34 and other devices, such as displays and storage memories.

Figure 4:
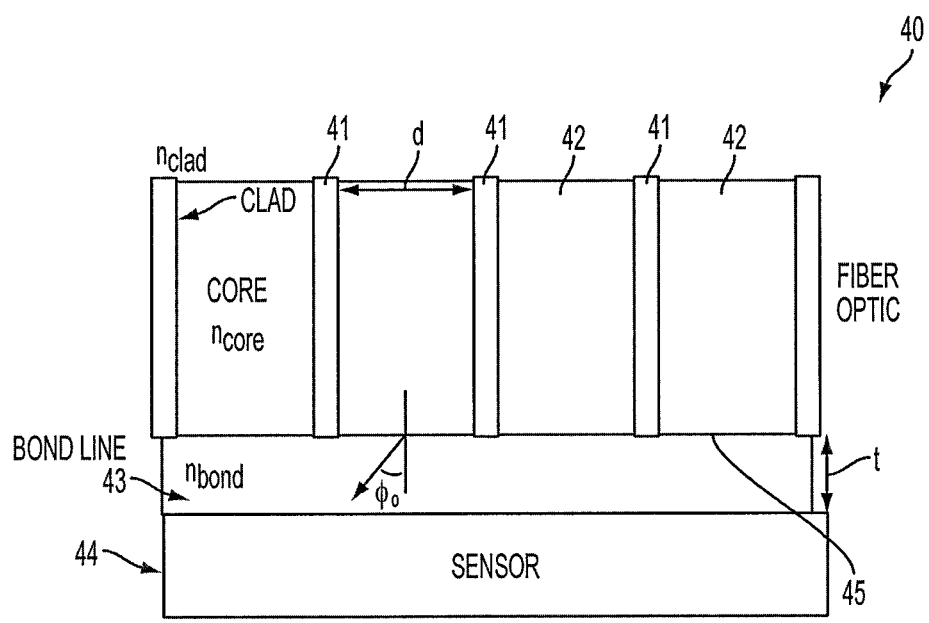
FIG. 4 is an example of a typical interface between an image sensor and a fiber optic bundle, showing a flat output surface between the fiber optic bundle and a bonding line for bonding the image sensor to the fiber optic bundle.

Referring next to FIG. 4, a typical interface is shown between an image sensor (such as image sensor 34) and a fiber optic bundle (such as fiber optic bundle 37). At the interface, designated as a bond line 43, an optical quality material is used to hold the fiber optic bundle 40 to silicon sensor 44. The optical material must be optically transparent, have a thermal expansion compatible with the fiber optic and the sensor. It must also have an index of refraction that limits reflection of light and is compatible with manufacturing assembly and temperature excursions. It must also have good bonding qualities. A typical configuration of the interface in FIG. 4 shows two characteristic geometry features. First, there is a finite thickness to the bond material (t). Second, the output surface 45 of the fiber optic bundle is flat.

A problem, however, is presented by the bond line (also referred to herein as a bond layer) shown in FIG. 4, because the bond line has a flat surface interfacing the flat surface 45 of fiber optic bundle 40. Light passing from each core 42 to bond line 43 is spread by the bonding material. This spreading degrades the MTF of the optically coupled fiber optic system. As the light exits each core in the fiber optic bundle, the light is refracted by any difference in the index of refraction, η, between the core ($\eta_{core}$) and the bonding material ($\eta_{bond}$).

Thus, the spot of light (D), which originally is the size of core 42 in the fiber optic bundle, is now larger when it impinges upon image sensor 44. If the surface of the image sensor is also flat, a fraction of the light is reflected and propagated in the bond material, i.e. etalon. In some sensor configurations, the surface is not planar and the change in geometry may break up the etalon effect and reduce the light spread, but the original spread is still present.

As will now be explained, the present invention reduces the MTF loss due to the optical bonding process in the fiber optic coupled camera by texturing the output surface 45 of fiber optic bundle 40. The texturing reduces the spread of light in bond line 43 between the fiber optic bundle 40 and the image sensor 44. Since texturing the output surface 45 of the fiber optic bundle 40 causes recesses (or voids) in the output surface, the bond material fills the recesses (or voids). In this manner, the light propagating toward the image sensor passes through only two different materials having, respectively, different indices of refraction, namely, $\eta_{core}$ and $\eta_{bond}$.

The present invention uses the geometry of each core and cladding in the fiber optic bundle to reduce spreading of the light as it exits each respective core of the fiber optic bundle. The angle in which the light leaves a flat surface (such as surface 45 in FIG. 4) of a fiber optic bundle is as follows:

$$\phi_o = \sin^{-1}\left(\frac{\eta_{core}}{\eta_{bond}}\sin\left(90 - \sin^{-1}\left(\frac{\eta_{clad}}{\eta_{core}}\right)\right)\right) \qquad \text{Eq. 1}$$

where:
$\eta_{core}$ is the index of refraction of the core material,
$\eta_{bond}$ is the index of refraction of the bonding material,
$\eta_{clad}$ is the index of refraction of the cladding material, and
$\phi_o$ is the angle in which the light leaves the flat surface of the fiber optic bundle.

Thus, the diameter of spot size ($D_o$) formed by the light leaving the flat surface 45 is then given by:

$$D_o = d + 2*t*\tan\phi_o \qquad \text{Eq. 2}$$

where:
$D_o$ is the diameter of the spot size formed by the light leaving the flat surface,
d is the diameter of the core of the fiber optic,
t is the thickness of the bond line or the bond layer, and
$\phi_o$ is the angle in which the light leaves the flat surface of the fiber optic bundle.

It will be appreciated that the thickness of the bond line cannot be made zero, because the bonding material is necessary for bonding the fiber optic bundle to the image sensor. The factor of 2 in the above equation is due to the light spreading on both sides of the core.

Figure 5:
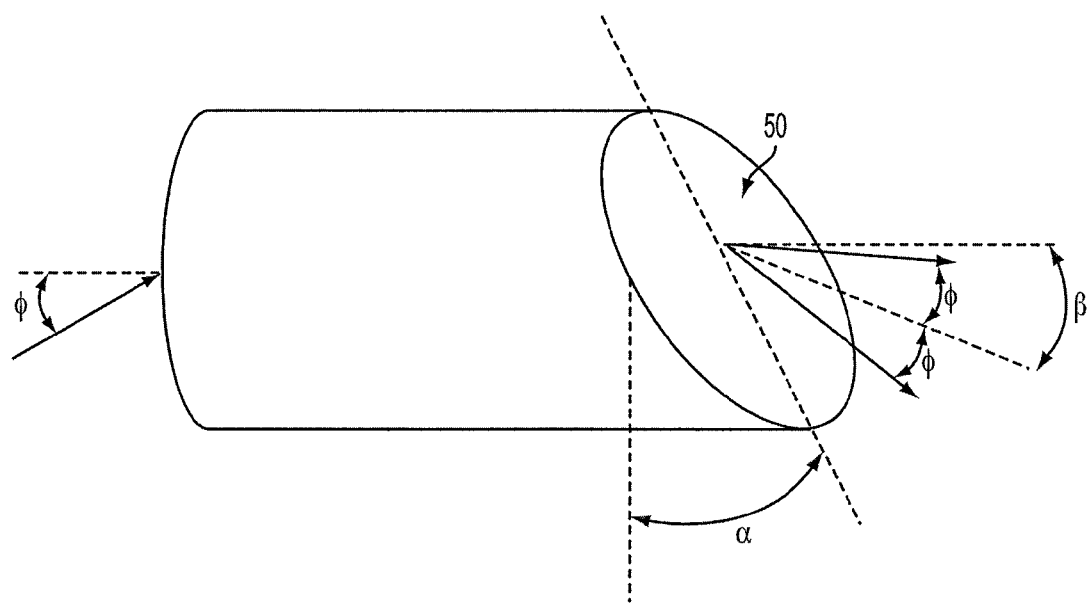
FIG. 5 is a perspective view of a single core having been shaped at its output surface by cutting the output face at an angle of alpha.

The inventor discovered that if the cores of the fiber optic bundle are individually shaped, then the angles in which the light exits each core in the fiber optic bundle may be manipulated. Referring now to FIG. 5, there is shown a perspective view of a single core 50 of a fiber optic bundle. The core is cut at an angle of a. The light exiting core 50 is given by the following equation:

$$\beta = \sin^{-1}\left(\frac{\eta_{core}}{\eta_{bond}}\sin\alpha\right) - \alpha \qquad \text{Eq. 3}$$

where:
β is the angle of the light exiting the core,
α is the angle in which the core is cut,
$\eta_{core}$ is the index of refraction of the core material, and
$\eta_{bond}$ is the index of refraction of the bonding material.

Figure 6:
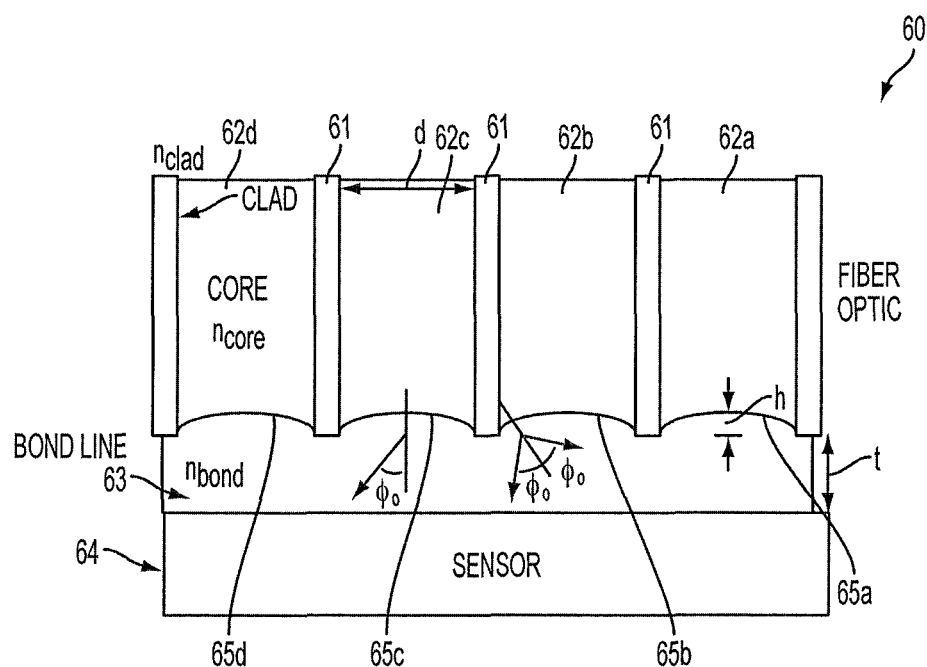
FIG. 6 is a cross-sectional view of a fiber optic coupled camera, showing an exemplary shaping of the output surface of the fiber optic bundle as it interfaces with an image sensor, in accordance with an embodiment of the present invention.

Instead of shaping the surface of the core to have a fixed angle of a, the surface of the core may be shaped differently. For example, the surface of the core may be rounded, as shown in FIG. 6 by surface 65a, 65b, 65c, or 65d. When the surface is rounded, the value of a changes continuously along the surface of each core and focusing of the light occurs.

Referring now to FIG. 6, fiber optic bundle 60 is coupled to image sensor 64 by bonding material at bond line (or bond layer) 63. The fiber optic bundle includes multiple cores 62, in which each core is surrounded by a cladding material 61. The output surface of fiber optic bundle 60 is shaped to form a rounded concave recess in each core 62. Four rounded concave recesses are shown in FIG. 6, designated as 65a, 65b, 65c and 65d, corresponding to the four cores, respectively shown as 62a, 62b, 62c and 62d. Each of the rounded concave recesses provide focusing of the light exiting the respective core.

The light exits each core at an angle of $\phi_o$ which changes along the surface forming the rounded concave recess of the respective core. The angle of $\phi_o$, however, remains the same with respect to a line drawn perpendicular to the rounded surface, as shown in FIG. 6. The overall angle is about the new exit angle of β, the latter shown in FIG. 5.

The bond line also has a new geometry that corresponds to the rounded concave surface of each core. As shown, the bond line 63 now has curved bumps (not labeled) that fill the rounded concave surfaces of the cores. In this regard, the bond line 63 may be visualized as being like a sheet of micro-lenses formed above a focal planar array in a camera. Thus, four curved bumps, or micro-lenses are shown (not labeled) that correspond to the four rounded concave surfaces of the cores, namely, 65a, 65b, 65c and 65d.

The diameter of the spot size ($D_t$) that is output from each shaped core in FIG. 6 now becomes:

$$D_t = d + 2*t*\tan(\beta \pm \phi_o) \qquad \text{Eq. 4}$$

where:
d is the diameter of the core of the fiber optic,
t is the thickness of the bond line or the bond layer,
β is the angle of the light exiting the core,
$\phi_o$ is the angle to a normal, in which the light leaves the surface of the fiber optic bundle, and
$D_t$ is the diameter of the spot size outputted from each shaped core.

Assuming that the protrusion height (h) into each core is a fraction of the diameter (d) of each core, then the protrusion includes a radius (r) which may be expressed as follows:

$$r = \frac{\left(h^2 + \frac{d^2}{4}\right)}{2h} \qquad \text{Eq. 5}$$

where:
r is the radius of the protrusion of each core,
d is the diameter of each core, and
h is the height of the protrusion of each core.

Figure 7:
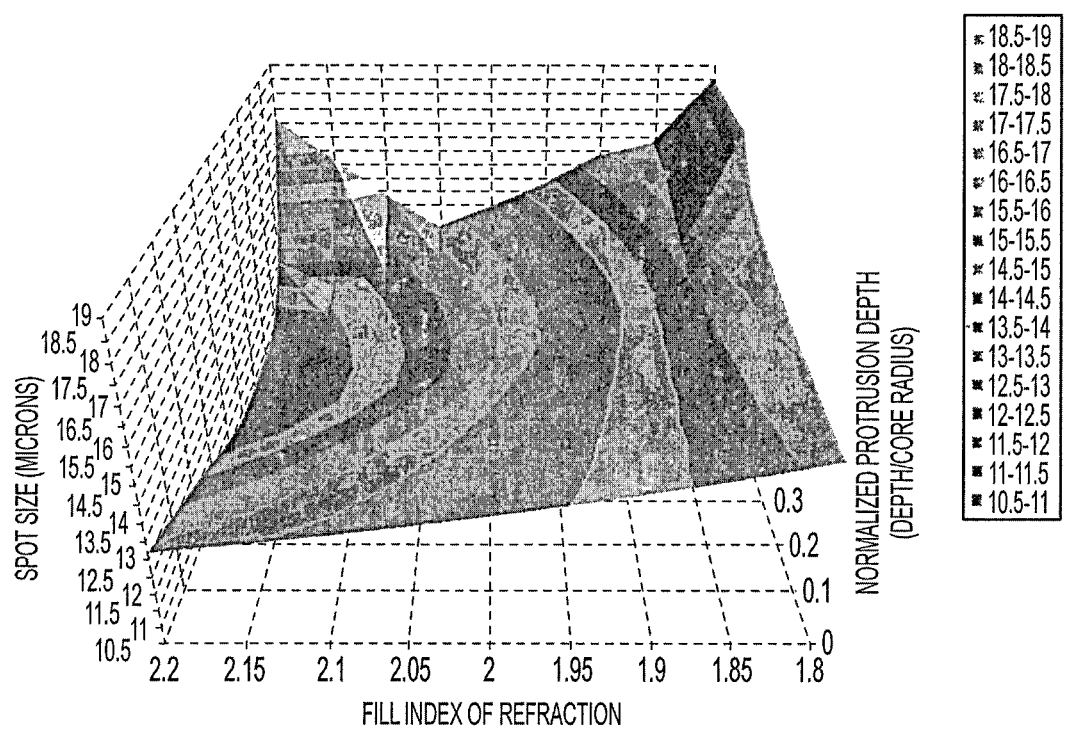
FIG. 7 is a graph of spot sizes of light (in microns) as a function of normalized protrusion depth (depth/core radius of a core in a fiber optic bundle) and as a function of index of refraction of a bonding material, in accordance with an embodiment of the present invention.

Referring next to FIG. 7, a graph of spot size (in microns) as a function of normalized protrusion depth (depth/core radius) and as a function of index of refraction of the bond material ($\eta_{bond}$) is shown. Parameters used in calculating the graph are typical values for a fiber optic bundle and a bond line thickness ($\eta_{core}$=1.87, $\eta_{clad}$=1.43, d=6 µm, t=6 µm).

The graph shows that as the index of refraction of the bond material increases the spot size decreases. The graph also shows that as the protrusion depth into the fiber optic increases the spot size decreases up to a point, then begins to increase again, as the light is scattered further away. The spot size may be decreased from about 19 μm ($\eta_{bond}$=1.56 typically) to less than 13 μm ($\eta_{bond}$=2.0, which is the highest value found in the literature) at h=1.8 μm. This leads to an MTF performance improvement for optical fiber coupled cameras.

Not accounted for in the graph is that the texture of the fiber optic surface breaks up the etaloning effect on the fiber optic side, even if the image sensor is flat. This may lead to further improvement in the MTF for such cameras.

Figure 8:
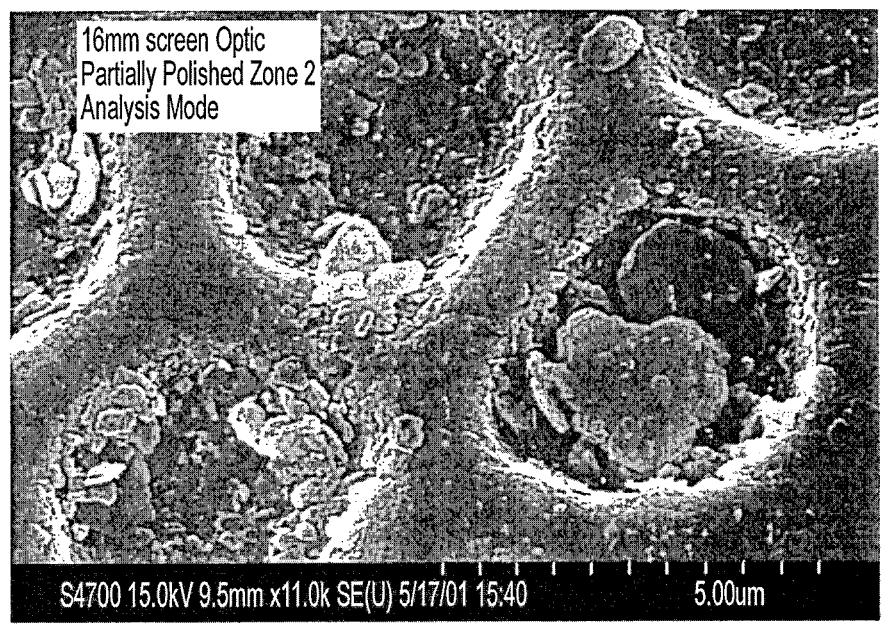
FIG. 8 is a top view of the output surface of a fiber optic bundle having been shaped by a chemical mechanical polish (CMP), in accordance with an embodiment of the present invention.

FIG. 8 shows a chemical mechanical polish (CMP) of a fiber optic surface. Controlling the depth and angle is dependent upon the chemistry of the slurry used during the CMP.

During the bonding process, special care may need to be taken to ensure that the bond material is displaced into the textured recess of each fiber optic core. In this manner, the bond material fills up the concave recesses of the cores.

The present invention may be used in image intensified cameras, optically coupled scintillators for X-rays, micro-lens arrays for multi-aperture systems, and fiber optic field correctors.

Although the invention is illustrated and described herein with reference to specific embodiments, the invention is not intended to be limited to the details shown. Rather, various modifications may be made in the details within the scope and range of equivalents of the claims and without departing from the invention.

What is claimed:

1. A camera comprising:
   an image intensifier ($I^2$),
   an image sensor,
   a fiber optic bundle comprised of multiple individual fibers for coupling the $I^2$ and the image sensor, and
   an output surface of the fiber optic bundle configured to provide light as an output to the image sensor, each fiber having a concave shape at the output surface of the fiber optic bundle,
   wherein the output surface of the fiber optic bundle is shaped to reduce spreading of the output light provided as an input to the image sensor,
   a bond layer is sandwiched between the output surface of the fiber optic bundle and the input surface of the image sensor, and
   the bond layer is in direct contact with the output surface of the fiber optic bundle and the input surface of the image sensor,
   wherein a top portion of the bond layer is shaped into multiple micro-lenses, and the concave shape of each fiber is configured to conform to each micro-lens of the bond layer.

2. The camera of claim 1 wherein
   the output surface is shaped for focusing the light provided to the image sensor.

3. The camera of claim 1 wherein
   the fiber optic bundle includes multiple fibers, each fiber comprised of a cladding surrounding a core,
   the light provided to the image sensor is configured to exit the core, and
   the output surface of the fiber optic bundle is shaped to focus the light exiting the core to form a spot size having a diameter of $D_f$, and $D_f < D_o$, where $D_o$ is defined as a spot size formed by the output surface of the fiber optic bundle when not shaped to focus the light exiting the core.

4. The camera of claim 1 wherein
   the bond layer is configured into a shape that is complementary to the shape of the output surface of the fiber optic bundle, thereby presenting an index of refraction determined by the bond layer to the light exiting the multiple fibers.

5. The camera of claim 1 wherein
   a boundary line is formed between the bond layer and the output surface of the fiber optic bundle for providing, in sequence, (a) an index of refraction of the output surface of the fiber optic bundle and (b) an index of refraction of the bond layer to the light exiting the multiple fibers.

6. The camera of claim 1 wherein
   each fiber includes a core and a cladding surrounding the core, and the core has a diameter of d,
   the concave shape of each fiber forms a recessed depth of h, and
   each micro-lens includes a protrusion corresponding to the recessed depth of h.

7. The camera of claim 6 wherein
   the bond layer has a thickness of t, and
   the diameter of d is approximately equal to the thickness of the bond layer of t.

8. The camera of claim 7 wherein
   the bond layer has a thickness of approximately 4-8 microns, and
   the diameter of each core is approximately 4-8 microns.

9. The camera of claim 1 wherein
   each fiber includes a core and a cladding surrounding the core,
   the core includes an index of refraction having a value of $\eta_{core}$ and the cladding includes an index of refraction having a value of $\eta_{clad}$,
   the bond layer includes an index of refraction having a value of $\eta_{bond}$, and
   the $\eta_{bond}$ value is selected to be higher than either the $\eta_{core}$ value or the $\eta_{clad}$ value.

10. The camera of claim 1
    wherein the bond layer has a thickness of t,
    the fiber optic bundle includes multiple cores, each core having a diameter of d, for forming an optical path for the light provided to the image sensor,
    each core is shaped to focus the light into a spot size of $D_f$, and $D_f$ is a function of the diameter of d, the thickness of t, and the shape of the output surface of the fiber optic bundle.

11. A camera comprising:
    an image intensifier ($I^2$),
    an image sensor,
    a fiber optic bundle comprised of multiple individual fibers for coupling the $I^2$ and the image sensor,
    an output surface of the fiber optic bundle configured to provide light as an output to the image sensor,
    wherein the output surface of the fiber optic bundle is shaped to reduce spreading of the output light provided as an input to the image sensor,
    a bond layer is sandwiched between the output surface of the fiber optic bundle and the input surface of the image sensor,
    the bond layer is in direct contact with the output surface of the fiber optic bundle and the input surface of the image sensor,
    wherein the bond layer has a thickness of t,
    wherein the fiber optic bundle includes multiple cores, each core having a diameter of d, for forming an optical path for the light provided to the image sensor, wherein each core is shaped to focus the light into a spot size of $D_f$, and $D_f$ is a function of the diameter of d, the thickness of t, and the shape of the output surface of the fiber optic bundle, and wherein the shape of the output surface of the fiber optic bundle includes multiple concave recesses in the multiple cores, and the bond layer is shaped to conform to the multiple concave recesses of the multiple cores.

12. A fiber optic bundle for coupling light from an image intensifier ($I^2$) to an image sensor, the fiber optic bundle comprising:

multiple cores for directing the light from the $I^2$ to the image sensor, each core having an output surface, and the output surface shaped into a recessed concave surface for focusing the light as an output toward the image sensor, wherein a bond layer is interposed between the output surface of each core and an input surface of the image sensor, the bond layer is in direct contact with the output surface of each core and the input surface of the image sensor, and the bond layer is shaped into multiple micro-lenses, each micro-lens is configured to conform to the recessed concave surface of each respective core.

13. The fiber optic bundle of claim 12 wherein the core includes an index of refraction having a value of $\eta_{core}$, the bond layer includes an index of refraction having a value of $\eta_{bond}$, and the $\eta_{bond}$ value is selected to be higher than the $\eta_{core}$ value.

14. The fiber optic bundle of claim 12 wherein the image sensor includes a CMOS imager or a CCD imager.

15. An intensified camera system including:
an image intensifier ($I^2$),
an image sensor,
a fiber optic bundle disposed between the $I^2$ and the image sensor, the fiber optic bundle comprising:

multiple cores for directing the light as an output from the $I^2$ to the light as an input to the image sensor, each core having an output surface, and the output surface shaped into a recessed concave surface for focusing the light toward the image sensor, wherein a bond layer is interposed between the output surface of each core and the image sensor, and the bond layer is in direct contact with the output surface of each core and the input surface of the image sensor, and the bond layer is shaped into multiple micro-lenses, each micro-lens configured to conform to the recessed concave surface of each respective core.

16. The system of claim 15 wherein
a surface of the bond layer facing the image sensor is substantially flat.

17. The system of claim 15 wherein
each micro-lens has an index of refraction that is greater than an index of refraction of each respective core.

* * * * *